United States Patent
Kim et al.

(10) Patent No.: US 12,393,075 B2
(45) Date of Patent: Aug. 19, 2025

(54) DISPLAY DEVICE AND BACKLIGHT UNIT

(71) Applicant: LG Display Co., Ltd., Seoul (KR)

(72) Inventors: Junehwan Kim, Paju-si (KR); Seong Il Kim, Paju-si (KR); HyunWoo Jeon, Paju-si (KR); JongHyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/769,209

(22) Filed: Jul. 10, 2024

(65) Prior Publication Data
US 2025/0085586 A1    Mar. 13, 2025

(30) Foreign Application Priority Data
Sep. 11, 2023   (KR) .................. 10-2023-0120678

(51) Int. Cl.
*G02F 1/1335* (2006.01)

(52) U.S. Cl.
CPC .. *G02F 1/133514* (2013.01); *G02F 1/133607* (2021.01); *G02F 2203/055* (2013.01)

(58) Field of Classification Search
CPC ................ G02F 1/133514; G02F 1/133607
USPC .......................................................... 349/106
See application file for complete search history.

(56) References Cited

U.S. PATENT DOCUMENTS

| | | | | |
|---|---|---|---|---|
| 2023/0137477 A1* | 5/2023 | Yin | .............. | G02F 1/133607 362/606 |
| 2024/0264357 A1* | 8/2024 | Ham | .............. | G02B 6/005 |
| 2025/0044644 A1* | 2/2025 | Benoit | .............. | G02F 1/133603 |
| 2025/0060524 A1* | 2/2025 | Fang | .............. | G02B 6/0053 |

FOREIGN PATENT DOCUMENTS

| | | | | |
|---|---|---|---|---|
| CN | 106814494 A | * | 6/2017 | ......... G02B 6/0053 |
| WO | WO-2010044619 A2 | * | 4/2010 | ......... G02B 6/0051 |

* cited by examiner

*Primary Examiner* — Christopher M Raabe
(74) *Attorney, Agent, or Firm* — Fenwick & West LLP

(57) ABSTRACT

A display device includes a display panel, a backlight unit supplying light to the display panel, and a conversion sheet located between the backlight unit and the display panel. The conversion sheet includes at least one conversion pattern. A top portion of the at least one conversion pattern has a greater area than a bottom portion the at least one conversion pattern. The at least one conversion pattern includes alternately stacked at least one first conversion layer having a first refractive index and at least one second conversion layer having a second refractive index different from the first refractive index.

26 Claims, 12 Drawing Sheets

DISPLAY DEVICE AND BACKLIGHT UNIT

CROSS REFERENCE TO RELATED APPLICATION

This application claims priority to and benefit of Republic of Korea Patent Application No. 10-2023-0120678, filed on Sep. 11, 2023, which is hereby incorporated by reference in its entirety.

TECHNICAL FIELD

Embodiments relate to a display device and a backlight unit and more particularly, for example, without limitation, to a display device able to shift a blue light wavelength harmful to humans to a blue light wavelength not harmful to humans while maintaining the brightness of the blue light and a backlight unit.

DESCRIPTION OF RELATED ART

Prolonged use of electronic devices, including display devices, results in increased exposure to blue light. Increased exposure to blue light has been associated with adverse human health effects, including dry eyes, sleep disturbances, increased eye strain, and visual display terminal (VDT) syndrome. As user perceptions and needs for healthcare electronics are being reconsidered and increased, the development of display devices able to reduce harmful blue light is underway.

The description provided in the discussion of the related art section should not be assumed to be prior art merely because it is mentioned in or associated with that section. The discussion of the related art section may include information that describes one or more aspects of the subject technology, and the description in this section does not limit scope of the present disclosure.

SUMMARY

When a conventional blue light filter layer is used, the luminance of blue light is reduced or minimized, and a large color change occurs due to the low cutoff characteristic. Therefore, the inventors of the present disclosure have invented a display device able to shift a blue light wavelength harmful to humans to a blue light wavelength not harmful to humans while maintaining the brightness of the blue light.

Embodiments may provide a display device including a conversion pattern capable of shifting blue light harmful to humans to blue light not harmful to humans.

Embodiments may provide a display device including blue light quantum dots and hollow scatterers capable of shifting blue light harmful to humans to blue light not harmful to humans.

Embodiments may provide a display device including: a display panel; a backlight unit supplying light to the display panel; and a conversion sheet located between the backlight unit and the display panel, wherein the conversion sheet includes at least one conversion pattern configured such that a top portion thereof has a greater area than a bottom portion thereof, and the at least one conversion pattern includes alternately stacked at least one first conversion layer having a first refractive index and at least one second conversion layer having a second refractive index different from the first refractive index.

Embodiments may provide a display device including: a display panel; a backlight unit supplying light to the display panel; and a conversion sheet located between the backlight unit and the display panel, wherein the conversion sheet includes blue light quantum dots, hollow scatterers, a base layer, and at least one conversion pattern having a refractive index different from the refractive index of the base layer, wherein the at least one conversion pattern is configured such that a top portion thereof has a greater area than a bottom portion thereof.

Embodiments may provide a backlight unit including: a plurality of light sources; a light guide plate into which light emitted from the light sources enters; and a prism sheet including a prism base located on the light guide plate and a plurality of prisms located on the prism base, wherein the prism base includes alternately stacked first portion having a third refractive index and second portion having a fourth refractive index.

According to exemplary embodiments, the display device may include the conversion pattern capable of shifting blue light harmful to humans to blue light not harmful to reduce or minimize blue light harmful to humans.

According to exemplary embodiments, the display device may include the blue light quantum dots and the hollow scatterers capable of shifting blue light harmful to humans to blue light not harmful to reduce or minimize blue light harmful to humans.

It is to be understood that both the foregoing general description and the following detailed description of the present disclosure are exemplary and explanatory and are intended to provide further explanation of the disclosure as claimed.

BRIEF DESCRIPTION OF DRAWINGS

The above and other objectives, features, and advantages of the present disclosure will be more clearly understood from the following detailed description, taken in conjunction with the accompanying drawings, in which.

Figure 1:
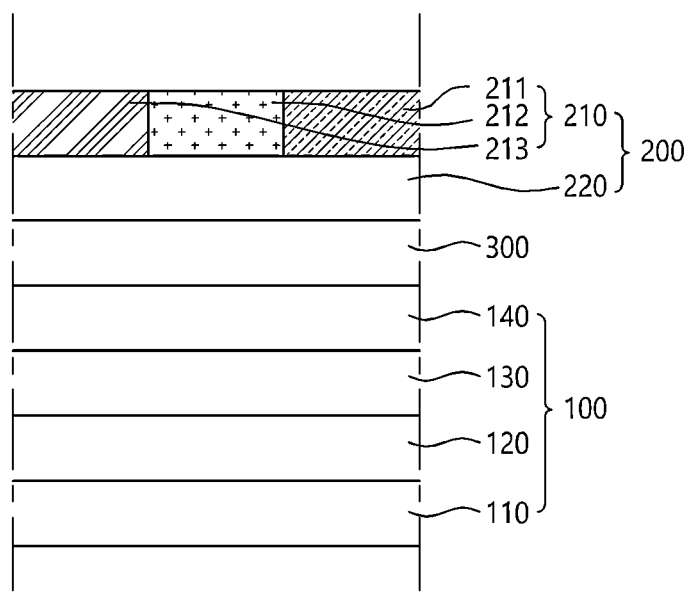
FIG. 1 illustrates the configuration of a display device according to an exemplary embodiment.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference will now be made in detail to embodiments of the present disclosure, examples of which may be illustrated in the accompanying drawings. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some exemplary embodiments of the present disclosure rather unclear. The terms such as "including", "having", "containing", "constituting", "make up of", and "formed of" used herein are generally intended to allow one or more components to be added unless the terms are used with the term "only". As used herein, singular forms are intended to include plural forms unless the context clearly indicates otherwise.

Terms, such as "first", "second", "A", "B", "(A)", "(B)", "(a)", or "(b)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, ratios, angles, and numbers etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, a variety of embodiments will be described in detail with reference to the accompanying drawings.

FIG. 1 illustrates the configuration of a display device 10 according to an exemplary embodiment.

Referring to FIG. 1, the display device 10 according to exemplary embodiments may include, but is not limited to, a backlight unit 100, a display panel 200, and a blue light filter layer 300 provided between the backlight unit 100 and the display panel 200.

The backlight unit 100 may include, but is not limited to, a light source 110 supplying light to the display panel 200, a light guide plate 120 disposed on the light source 110, a prismatic sheet 130 disposed on the light guide plate 120, a diffusion sheet 140 disposed on the prismatic sheet 130, and the like.

The light source 110 may provide light supplied to the display panel 200.

The light source 110 may be, for example, a plurality of light sources.

The light guide plate 120 having a predetermined thickness may be located on the light source 110.

The light guide plate 120 may have, for example, a rectangular shape.

The material of the light guide plate 120 may be any one of polymethyl methacrylate (PMMA), polyethylene terephthalate (PET), poly carbonate (PC), polyethylene naphthalene (PEN), and cellulose triacetate (CTA) having good transmissivity, but is not necessarily limited thereto. Further, other suitable materials having good transmissivity are also possible.

The prismatic sheet 130 disposed on the light guide plate 120 has a regular array of triangular prisms on the top surface thereof, which may cause light to travel vertically to improve luminance.

The prismatic sheet 130 may include, for example, a plurality of prisms in the shape of a triangular column, but is not limited thereto.

Each of the plurality of prisms may be shaped such that the width of the upper portion is narrower than the width of the lower portion, but is not limited thereto.

The prisms may be arranged in a regular array.

The prismatic sheet 130 may regulate the path of light supplied by the light source 110, thereby increasing the luminance of the backlight unit 100.

Figure 9A:
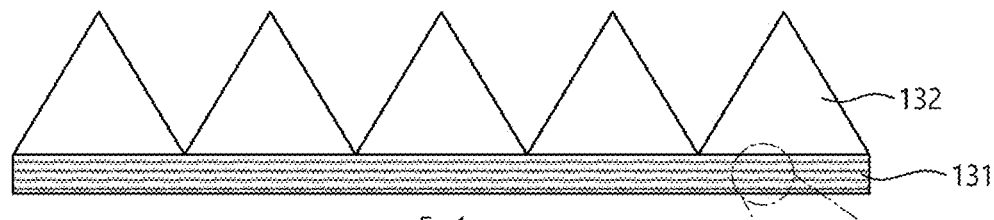
FIGS. 9A-9C illustrate the cross-section of the prismatic sheet of the backlight unit according to exemplary embodiments.
Figure 9B:
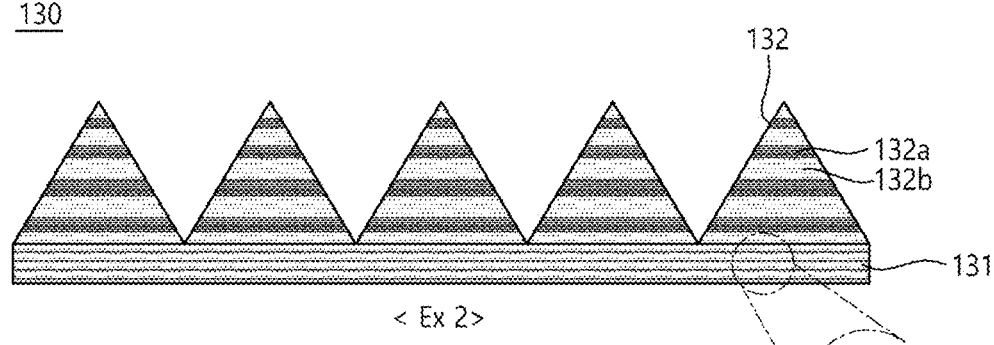

For example, as shown in FIGS. 9A-9B, the prismatic sheet 130 may include a prism base 131 and prisms 132 located on the prism base 131, but is not limited thereto.

Figure 9C:
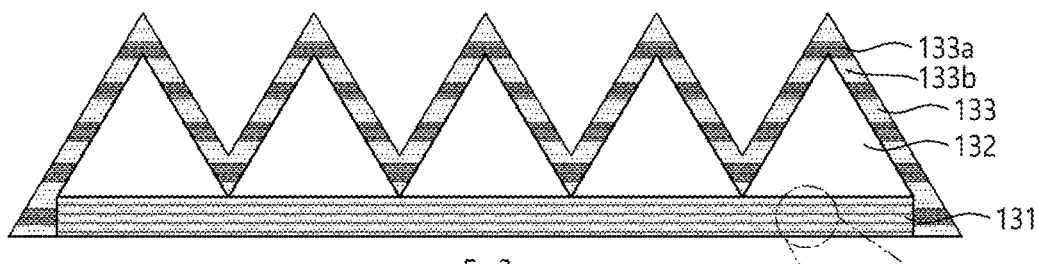

Alternatively, as shown in FIG. 9C, the prismatic sheet 130 may further include, in addition to the prism base 131 and the prisms 132, a prism outer portion 133, but is not limited thereto.

The prismatic sheet 130 will be described in more detail when described with reference to FIGS. 9A-9C.

The diffusion sheet 140 may diffuse light to provide light to the display panel 200. The display panel 200 may be disposed on the backlight unit 100.

As one example, the display panel 200 may include a liquid crystal layer 220 and a color filter 210.

The liquid crystal layer 220 may be disposed on a lower substrate (not shown).

The color filter 210 may be disposed on an upper substrate (not shown). In some cases, the color filter 210 may be disposed on the lower substrate, and the liquid crystal layer 220 may be located on top of the color filter 210.

A polarizer plate (not shown) may be located on top or bottom of the display panel 200, but is not limited thereto.

The polarizer plate (not shown) may be a horizontal polarizer or a vertical polarizer, but is not limited thereto.

As one example, the color filter 210 may include a plurality of color filters, such as a first color filter 211, a second color filter 212, and a third color filter 213. Further, other suitable numbers of color filters are also possible.

In an example, the first color filter 211 may be a red color filter, the second color filter 212 may be a green color filter, and the third color filter 213 may be a blue color filter, but the present disclosure is not limited thereto. Alternatively, each of the first, second and third color filters may be configured as another color filter (e.g., white, cyan, magenta, or yellow, etc.).

The blue light filter layer 300 may include a dye (or pigment) and a binder.

The dye (or pigment) used in the blue light filter layer 300 may be a yellow colorant, but is not limited thereto.

The blue light filter layer 300 may reduce or minimize the intensity of hazardous blue light harmful to humans by cutting off the wavelength range of hazardous blue light. As one example, the blue light filter layer 300 may reduce or minimize the intensity of hazardous blue light harmful to humans by cutting off 415 nm to 455 nm, which is the wavelength range of hazardous blue light, but is not limited thereto. As used herein, the term "cutoff" may be interpreted as blocking energy or light.

Figure 2:
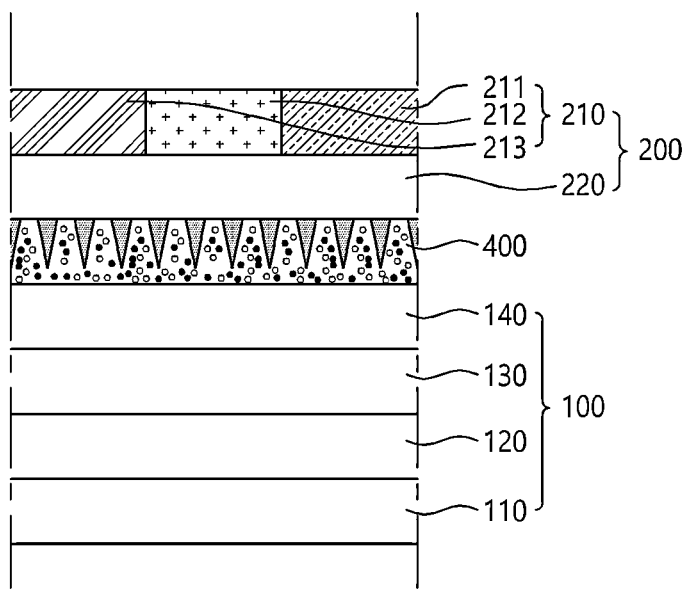
FIG. 2 illustrates the configuration of the display device according to another exemplary embodiment.

Alternatively, exemplary embodiments of FIG. 2 may provide a conversion sheet 400 capable of improving color gamut and luminance and blocking hazardous blue light harmful to humans.

FIG. 2 illustrates the configuration of the display device 10 according to another exemplary embodiment.

Figure 3:
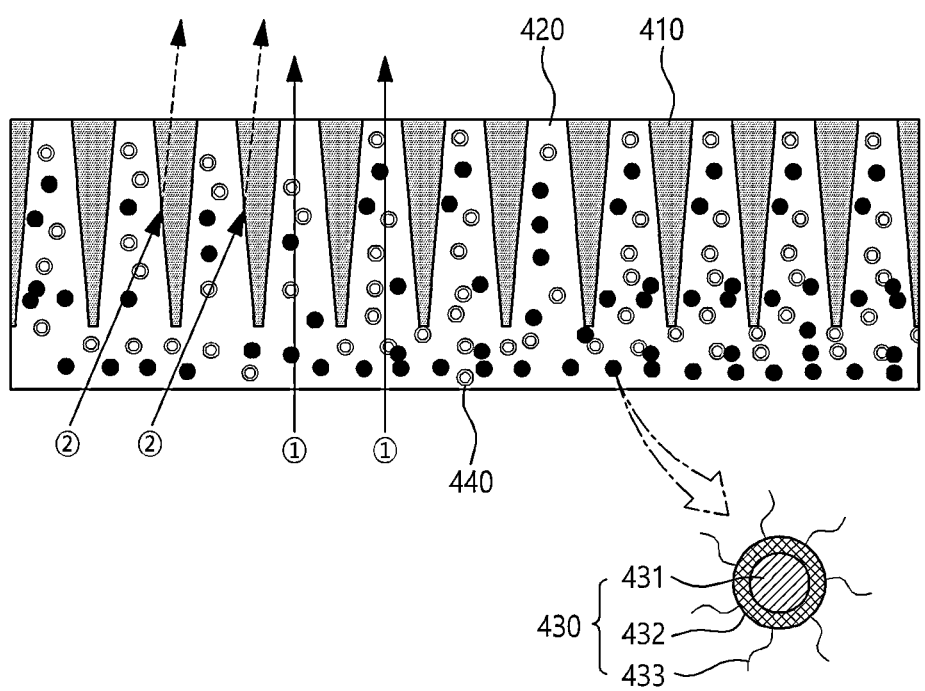
FIG. 3 illustrates the cross-section of the conversion sheet of the display device according to an exemplary embodiment.

FIG. 3 illustrates the cross-section of the conversion sheet 400 of the display device 10 according to an exemplary embodiment.

Referring to FIG. 2, the display device 10 according to an exemplary embodiment may include, but is not limited to, the backlight unit 100, the display panel 200, and the conversion sheet 400 provided between the backlight unit 100 and the display panel 200. In the display device 10 illustrated in FIG. 2, substantially the same components as in FIG. 1 are designated by the same reference numerals, and detailed descriptions thereof will be omitted or briefly given.

The conversion sheet 400 may shift a wavelength range of blue light harmful to humans, to blue light having a different wavelength range not harmful to humans without reducing luminance. As one example, the conversion sheet 400 may shift 415 nm to 455 nm, i.e., a wavelength range of blue light harmful to humans, to blue light having a different wavelength range not harmful to humans without reducing luminance, but is not limited thereto.

Referring to FIG. 3, the conversion sheet 400 of the display device 10 according to an exemplary embodiment may include at least one conversion pattern 410, a base layer 420, blue light quantum dots 430, hollow scatterers 440, and the like.

The blue light quantum dots 430 and the hollow scatterers 440 may be dispersed in the base layer 420.

In the at least one conversion pattern 410, the area of the top portion may be larger than the area of the bottom portion, but is not limited thereto.

The cross-section of the at least one conversion pattern 410 may be, an inverted trapezoid, as shown in FIG. 3, but is not necessarily limited thereto. Alternatively, the cross-section of the at least one conversion pattern 410 may be an inverted triangle, and includes any shape in which the area of the top portion is larger than the area of the bottom portion.

The at least one conversion pattern 410 may be disposed to be spaced apart from each other, but is not limited thereto.

When the conversion patterns 410 are spaced apart from each other, light ① emitted vertically from the light source 110 may travel to the display panel 200 through the base layer 420 without passing through the conversion pattern 410, so that the path of the light is not changed. As a result, a decrease in the luminance of the light may be prevented or at least reduced.

The height of the conversion pattern 410 may be the same or lower than the height of the conversion sheet 400. For example, the height of the conversion pattern 410 may be 500 μm or less.

The base layer 420 may be formed of a transparent polymer, but is not limited thereto.

The blue light quantum dots 430 and the hollow scatterers 440 may be dispersed on the base layer 420.

The blue light quantum dots 430 may be quantum dots that emit blue light. The emitting wavelength of the blue light quantum dots 430 may preferably range from 460 nm to 500 nm, but is not limited thereto.

On the other hand, the wavelength band of blue light harmful to humans may range from 415 nm to 455 nm, but is not limited thereto.

A Stokes shift of 5 nm to 10 nm is desired to minimize the ratio of not harmful blue light (460 nm to 500 nm) to harmful blue light (415 nm to 455 nm).

As one example, each of the blue light quantum dots 430 may include a core 431 and a shell 432 disposed around the core 431. Although the blue light quantum dots 430 each having a structure comprised of the core 431 and the shell 432 are shown in FIG. 3, the blue light quantum dots 430 of the present disclosure are not limited to quantum dots having this heterologous structure and may have a single structure.

In FIG. 3, the blue light quantum dots 430 are shown as having the shape of spheres, but are not limited thereto, and may have the shape of pyramidal particles, multi-armed particles, or cubic particles, such as nanoparticles, nanotubes, nanowires, nanofibers, or nanoplatelets.

When each of the blue light quantum dots 430 has a structure comprised of the core 431 and the shell 432, the core 431 is substantially a portion where the light emission occurs. The emission wavelength of the blue light quantum dots is determined by the size of core 431. In order to receive the quantum confinement effect, the size of the core 431 is typically smaller than the exciton Bohr radius depending on the material, and may have an optical band gap at the corresponding size.

The blue light quantum dots 430 may be semiconductor nanocrystals or metal oxide particles having a quantum confinement effect. For example, the blue light quantum dots 430 may include, but are not limited to, nanosemiconductor compounds of the II-VI group, the I-III-VI group, or the III-V group, but are not limited thereto.

More specifically, the core 431 and/or the shell 432 of each of the blue light quantum dots 430 may be nanocrystals having a core-shell structure, including Group II to Group VI compound semiconductor nanocrystals such as CdS, CdSe, CdTe, ZnS, ZnSe, ZnTe, HgS, HgTe, and/or a combination thereof; Group III to Group V or Group IV to Group VI compound semiconductor nanocrystals such as GaP, GaAs, GaSb, InP, InAs, and/or InSb; PbS, PbSe, PbTe, and/or a combination thereof; nanocrystals such as AgGaS2, AgGaSe2, AgGaTe2, CuInS2, CuInSe2, CuGaS2, and/or CuGaSe2; metal oxide nanoparticles such as ZnO, TiO2, and/or a combination thereof; nanocrystals such as CdSe/ZnSe, CdS/ZnS, ZnSe/ZnS, InP/ZnSZnO/MgO, and/or a combination thereof, without being limited thereto. The semiconductor nanoparticles may be doped or undoped with a rare earth element such as Eu, Er, Tb, Tm, Dy, or a combination thereof, or doped with a transition metal element such as Mn, Cu, Ag, Al, or a combination thereof, without being limited thereto. For example, the core 431 of the blue light quantum dots 430 may be selected from the group comprising ZnSe, ZnTe, CdSe, CdTe, InP, ZnCdS, $Cu_xIn_{1-x}S$, $Cu_xI_{n-x}Se$, $Ag_xIn_{1-x}S$, and combinations thereof, without being limited thereto.

In addition, the shell 432 of each of the blue light quantum dots 430 may be selected from the group comprising of ZnS, GaP, CdS, ZnSe, CdS/ZnS, ZnSe/ZnS, ZnS/ZnSe/CdSe, GaP/ZnS, CdS/CdZnS/ZnS, ZnS/CdSZnS, $Cd_xZn_{1-x}S$, and combinations thereof, without being limited thereto. The blue light quantum dots 430 may also be alloy quantum dots (QDs) (e.g., $CdS_xSe_{1-x}$, $CdSe_xTe_{1-x}$, or $Zn_xCd_{1-x}Se$), such as homogeneous alloy QDs or gradient alloy QDs, without being limited thereto.

Alternatively, each of the blue light quantum dots 430 may further include a ligand 433 in the structure comprised of the core 431 and/or the shell 432.

The ligand 433 may be bound to the surface of the shell 432 of the blue light quantum dot 430 and included in the blue light quantum dot 430. The ligand 433 may improve the dispersibility of the blue light quantum dot 430 in the base layer 420.

The hollow scatterers 440 are particles for internal scattering, which may maximize or at least increase the luminescence efficiency of the blue light quantum dots 430.

The size of the hollow scatterers 440 may be, but is not limited to, 500 nm to 2000 nm.

The hollow scatterers 440 may be transparent conductive oxide (TCO) particles, particularly, $TiO_2$ particles, without being limited thereto.

Each of the hollow scatterers 440 has a cavity in the interior thereof to reduce or minimize the transmittance due to the geometry characteristic thereof.

A plurality of blue light quantum dots 430 and a plurality of hollow scatterers 440 may be dispersed in the base layer 420. A mixture of the blue light quantum dots 430 and the hollow scatterers 440 in the base layer 420 may maximize or at least increase the luminous efficiency of the blue light quantum dots 430.

The number of the blue light quantum dots 430 and the number of the hollow scatterers 440 may be the same or different. Particularly, when the number of the blue light quantum dots 430 is different from the number of the hollow scatterers 440, the number of the hollow scatterers 440 may be greater than the number of the blue light quantum dots 430, without being limited thereto. More particularly, the ratio of the number of the blue light quantum dots to the number of the hollow scatterers may be 1:10, without being limited thereto.

In the conversion sheet 400, the refractive index of the base layer 420 and the refractive index of at least one conversion pattern 410 are different, without being limited thereto.

As one example, the refractive index of the base layer 420 may be greater than the refractive index of the at least one conversion pattern 410.

Because the refractive index of the base layer 420 is greater than the refractive index of the at least one conversion pattern 410, when light ②  from the light source 110 enters the conversion pattern 410 from the base layer 420, the angle of refraction is greater than the angle of incidence, which may change the path of the light toward the display panel 200. Meanwhile, light ① emitted vertically from the light source 110 may travel to the display panel 200 through the base layer 420 without passing through the conversion pattern 410, so that the path of the light is not changed.

The light path may be redirected toward the display panel 200 to prevent or at least reduce a decrease in luminance.

The refractive index of the base layer may be greater than or equal to 1.8 and the refractive index of the at least one conversion pattern may be less than 1.8, but the present disclosure is not limited thereto.

Figure 4:
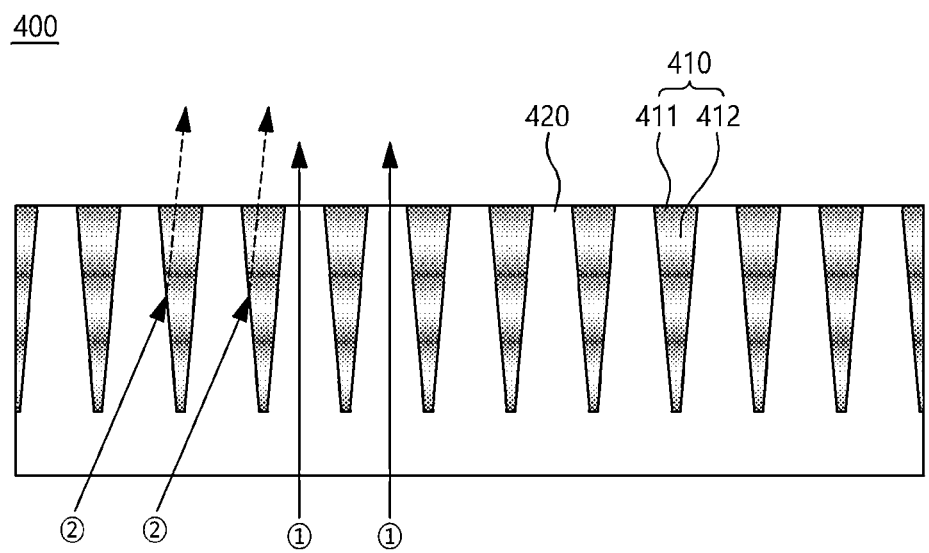
FIG. 4 illustrates the cross-section of the conversion sheet of the display device according to another exemplary embodiment.

FIG. 4 illustrates the cross-section of the conversion sheet 400 of the display device according to another exemplary embodiment.

Referring to FIG. 4, the conversion sheet 400 of the display device 10 according to another exemplary embodiment may include at least one conversion pattern 410 and a base layer 420. In the conversion sheet 400 illustrated in FIG. 4, substantially the same components as in FIG. 3 are designated by the same reference numerals, and detailed descriptions thereof will be omitted or briefly given.

The base layer 420 may be substantially the same as the base layer 420 described with reference to FIG. 3, and detailed descriptions thereof will be omitted or briefly given.

The at least one conversion pattern 410 may be configured such that the area of the top portion is larger than the area of the bottom portion, but is not limited thereto.

The cross-sectional shape of the at least one conversion pattern 410 may be substantially the same as the cross-sectional shape of the at least one conversion pattern 410 described with reference to FIG. 3, and detailed descriptions thereof will be omitted or briefly given.

The at least one conversion pattern 410 may have a multilayer structure. As one example, the at least one conversion pattern 410 may include at least one first conversion layer 411 having a first refractive index and at least one second conversion layer 412 having a second refractive index different from the first refractive index, the first conversion layer 411 alternating with the second conversion layer 412.

The first conversion layer 411 may be located at the end of the at least one conversion pattern 410, and the first refractive index may be greater than the second refractive index, but is not limited thereto. Alternatively, the second conversion layer 412 may be located at the end of the at least one conversion pattern 410.

The term "end" as used herein refers to the upper end and/or the lower end.

In FIG. 4, the end in the conversion pattern 410 is disposed from the first conversion layer 411, but is not necessarily limited to, and may be disposed from the second conversion layer 412.

The first refractive index may be greater than or equal to 1.6 and the second refractive index may be less than or equal to 1.4, but is not limited thereto.

At least one of the first conversion layer 411 or the second conversion layer 412 may be, but is not limited to, two or more of the first conversion layer 411 or the second conversion layer 412.

When at least one of the first conversion layer 411 or the second conversion layer 412 is two or more, the minimum number of layers of the first conversion layer 411 and the second conversion layer 412 may be three or more, but is not limited thereto.

Particularly, the number of layers of the first conversion layer 411 and the second conversion layer 412 may be five or more, but is not limited thereto.

When the number of layers of the first conversion layer 411 and the second conversion layer 412 is five or more, blue light harmful to humans may be efficiently cut off.

More specifically, the cutoff characteristics may be adjusted according to the thickness and the total number of layers of each of the first conversion layer 411 and the second conversion layer 412.

When each of the first conversion layer 411 and the second conversion layer 412 is two or more layers, the thickness of the thickest layer of the two or more first conversion layers and the thickness layer of the thickest of the two or more second conversion layers may each be 5 μm or less, but is not limited thereto.

When the thickness of the first conversion layer 411 and the second conversion layer 412 are each 5 μm or less, a conversion pattern 410 having more first conversion layers or second conversion layers in the same height of the conversion pattern 410 may be fabricated.

Within the conversion sheet 400, the refractive index of the base layer 420 may be the largest, followed by the first refractive index of the conversion layer 411, and the second refractive index of the second conversion layer 412, in the increasing order of refractive index.

As one example, the refractive index of the base layer 420 may be greater than or equal to 1.8, the first refractive index of the conversion layer 411 may be greater than or equal to 1.6 and less than or equal to 1.8, and the second refractive index of the second conversion layer 412 may be less than or equal to 1.4, but the present disclosure is not limited thereto.

When the refractive index of the base layer, the first refractive index of the conversion layer, and the second refractive index of the second conversion layer satisfy the above values, it is possible to effectively cut off blue light harmful to humans while preventing or at least reducing the luminance of blue light from decreasing.

Figure 5:
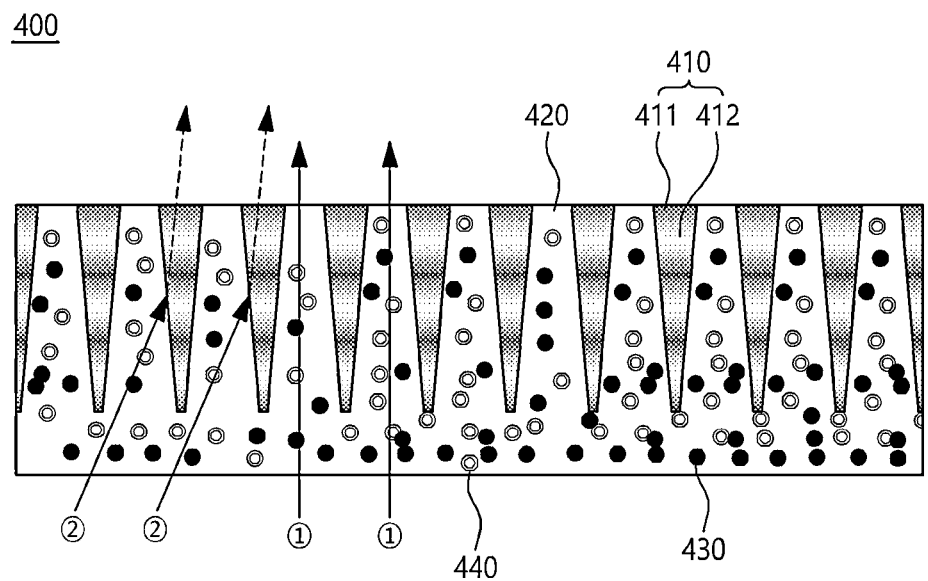
FIG. 5 illustrates the cross-section of the conversion sheet of the display device according to yet another exemplary embodiment.

FIG. 5 illustrates the cross-section of the conversion sheet 400 of the display device 10 according to yet another exemplary embodiment. In the conversion sheet 400 illustrated in FIG. 5, substantially the same components as in FIG. 4 are designated by the same reference numerals, and detailed descriptions thereof will be omitted or briefly given.

Referring to FIG. 5, the conversion sheet 400 of FIG. 4 may further include blue light quantum dots 430 and hollow scatterers 440.

The blue light quantum dots 430 and hollow scatterers 440 of FIG. 5 may be substantially the same as the blue light quantum dots 430 and the hollow scatterers 440 described with reference to FIG. 3, and detailed descriptions thereof will be omitted or briefly given.

When the base layer 420 of FIG. 4 further includes the blue light quantum dots 430 and the hollow scatterers 440, as in the case of the conversion sheet 400 of FIG. 5, the conversion pattern 410 may efficiently cut off blue light harmful to humans while preventing or at least reducing luminance reduction and shift blue light harmful to humans to blue light not harmful to humans by Stokes shift.

In addition, the conversion sheet 400 of FIG. 5 may prevent or at least reduce color change due to the high cutoff.

Various modifiable embodiments of the conversion sheet 400 have been described hereinabove with reference to FIGS. 3 to 5. The conversion pattern 410 and the hollow scatterers 440 of the conversion sheet 400 will be described below with reference to FIGS. 6 and 7.

Figure 6:
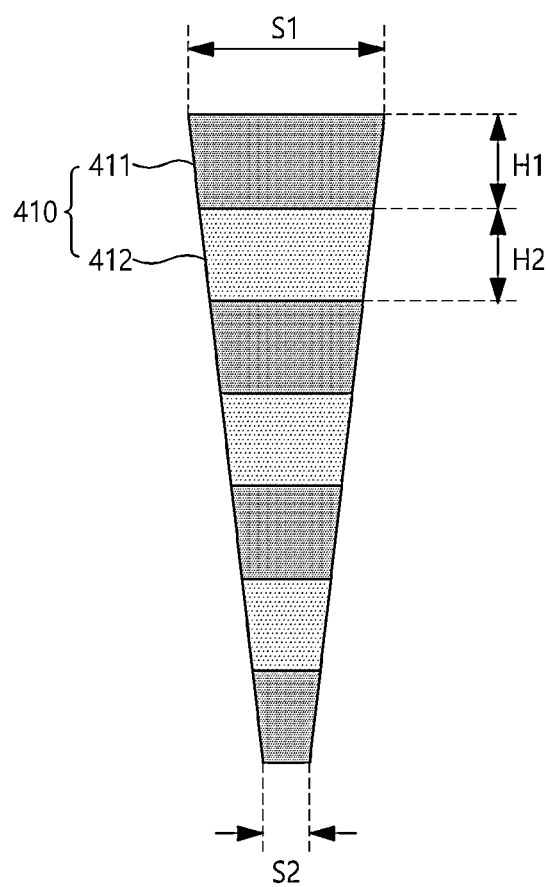
FIG. 6 illustrates the cross-section of the conversion pattern of the conversion sheet according to exemplary embodiments.

FIG. 6 illustrates the cross-section of the conversion pattern 410 of the conversion sheet 400 according to exemplary embodiments.

The conversion pattern 410 may have a multilayer structure including, but is not limited to, alternately stacked first conversion layers 411 having a first refractive index and second conversion layers 412 having a second refractive index different from the first refractive index.

In the conversion pattern 410, the number of layers of the first conversion layers 411 and second conversion layers 412 may be, but is not limited to, five.

The conversion pattern 410 may be configured such that one layer of the first conversion layers 411 is located at the end of the conversion pattern, but is not limited thereto. Alternatively, one layer of the second conversion layers 412 may be located at the end of the conversion pattern.

The height H1 of each of the first conversion layers 411 and the height H2 of each of the second conversion layers 412 may be the same or different.

The height of the first conversion layers 411 within the conversion pattern 410 may be different from each other. Particularly, the height H1 of the first conversion layers 411 may be 5 μm or less, but is not limited thereto.

In addition, the height of the second conversion layers 412 in the conversion pattern 410 may be different from each other. Particularly, the height H2 of the second conversion layers 412 may be 5 μm or less, but is not limited thereto.

The area S1 of the top portion of the conversion pattern 410 may be larger than the area S2 of the bottom portion, but is not limited thereto.

Figure 7:
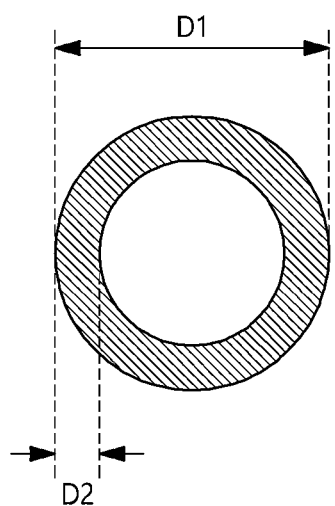
FIG. 7 illustrates the cross-section of one of the hollow scatterers of the conversion sheet according to exemplary embodiments.

FIG. 7 illustrates the cross-section of one of the hollow scatterers 440 of the conversion sheet 400 according to exemplary embodiments.

Referring to FIG. 7, each of the hollow scatterers 440 has an amount of cavity subtracted from the diameter D1 of the hollow scatterer 440 by a value 2×D2 twice the thickness of the hollow scatterer 440 to reduce or minimize the transmittance of the hollow scatterer 440.

The diameter D1 of each of the hollow scatterers 440 may be, but is not limited to, 500 nm to 2000 nm.

The thickness (D2) of each of the hollow scatterers 440 may be, but is not limited to, 50 nm to 200 nm.

The material of the hollow scatterers 440 is substantially the same as the hollow scatterers 440 described with reference to FIG. 3. The hollow scatterers 440 may be transparent conductive oxide (TCO) particles, particularly, $TiO_2$ particles, without being limited thereto.

In FIG. 7, the hollow scatterers 440 are shown as having the shape of spheres, but are not limited thereto, and may have the shape of pyramidal particles, multi-armed particles, or cubic particles, such as nanoparticles, nanotubes, nanowires, nanofibers, or nanoplatelets.

The conversion pattern 410 and the hollow scatterers 440 of the conversion sheet 400 have been described hereinabove with reference to FIGS. 6 and 7. The geometry of the top portion of the conversion pattern 410 of the conversion sheet 400 will be described below with reference to FIGS. 8A and 8B.

Figure 8A:
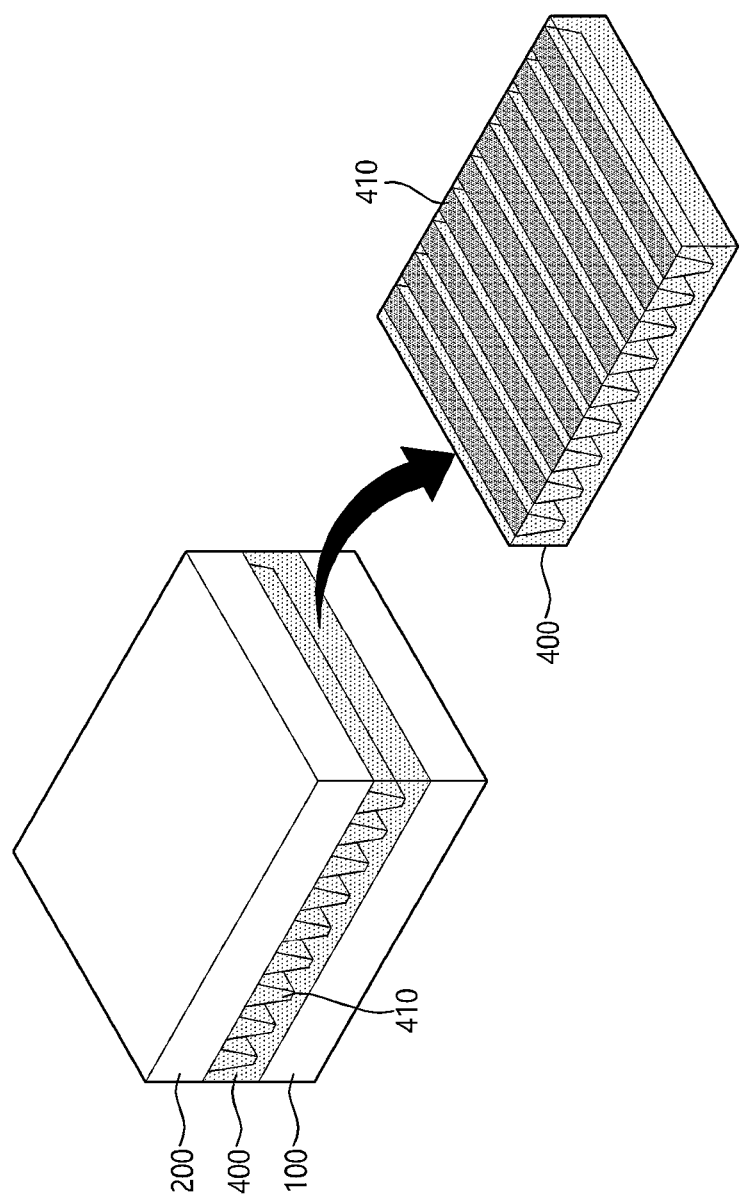
FIG. 8A illustrates a perspective view in which the top portion of the conversion pattern of the conversion sheet has the shape of stripes according to exemplary embodiments.

FIG. 8A illustrates a perspective view in which the top portion of the conversion pattern 410 of the conversion sheet 400 has the shape of stripes according to exemplary embodiments.

Referring to FIG. 8A, the conversion pattern 410 in the conversion sheet 400 is arranged in the form of partitions so as to be spaced apart from each other such that the top portion of the conversion pattern 410 may appear in the form of stripes when viewed in a top view, without being limited thereto. Alternatively, the top portion of the conversion pattern 410 may appear in the form of islands when viewed in a top view, as shown in FIG. 8B.

The conversion pattern 410 of the conversion sheet 400 may be configured such that the area of the top portion is larger than the area of the bottom portion, but is not limited thereto.

Figure 8B:
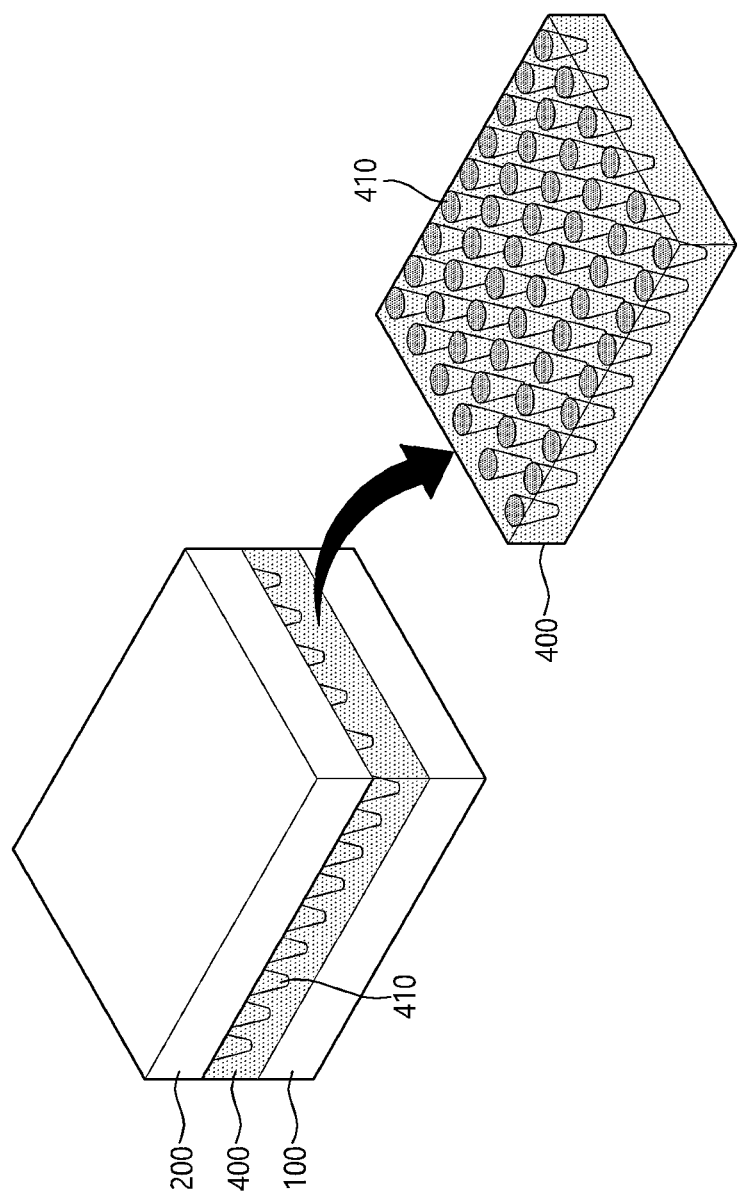
FIG. 8B illustrates a perspective view in which the top portion of conversion pattern of the conversion sheet has the shape of islands according to exemplary embodiments.

FIG. 8B illustrates a perspective view in which the top portion of conversion pattern 410 of the conversion sheet 400 has the shape of islands according to exemplary embodiments.

Referring to FIG. 8B, the top portion of the conversion pattern 410 in the conversion sheet 400 may appear in the form of islands when viewed in a top view, without being limited thereto.

The top portion of the conversion pattern 410, shown in FIGS. 8A and 8B, may be striped or island shaped, but is not limited thereto, and may be diagonal or a mesh shaped.

The conversion pattern 410 is shown in FIGS. 8A and 8B such that the top and bottom portions thereof have the same shape, but are not limited thereto, and the top and bottom portions may have different shapes. For example, when the top and bottom portions have different shapes, the top portion may have a circular shape while the bottom portion may have an elliptical shape. In another example, the top portion may have a polygonal shape while the bottom portion may have a circular shape.

Hereinabove, the conversion sheet 400 for cutting off Hazard blue light has been described. The prismatic sheet 130, which may have the same or similar function as the conversion sheet 400, will be described below.

FIGS. 9A-9C illustrates the cross-section of the prismatic sheet 130 of the backlight unit 100 according to exemplary embodiments.

The prismatic sheet 130 may be substantially the same as the prismatic sheet 130 described with reference to FIG. 1.

Referring to FIGS. 9A-9C, the prismatic sheet 130 may be Ex. 1 as shown in FIG. 9A, Ex. 2 as shown in FIG. 9B, or Ex. 3 as shown in FIG. 9C.

Referring to Ex. 1 in FIG. 9A, the prismatic sheet 130 may include a prism base 131 and a plurality of prisms 132 located on the prism base 131.

The prism base 131 may be located on the light guide plate 120.

The prism base 131 may include alternately stacked first portions 131a and second portions 131b, the first portions 131a having a third refractive index, and the second portions 131b having a fourth refractive index different from the third refractive index.

The third refractive index may be substantially the same as the first refractive index of the conversion layer described with reference to FIG. 4, and the fourth refractive index may be substantially the same as the second refractive index of the second conversion layer described with reference to FIG. 4, but the present disclosure is not limited thereto. In this case, the third refractive index may be greater than or equal to 1.6 and the fourth refractive index may be less than or equal to 1.4, but is not limited thereto. Such refractive indices may have different numerical values.

The material of the first portions 131a may be substantially the same as the material of the first conversion layer 411 described with reference to FIG. 4, and the material of the second portions 131b may be substantially the same as the material of the second conversion layer 412 described with reference to FIG. 4, but the present disclosure is not limited thereto. Also, the first portions 131a and the second portions 131b may include different materials from those described with reference to FIG. 4, respectively.

When the prism base 131 has a structure in which the first portions 131a having the third refractive index and the second portions 131b having the fourth refractive index different from the third refractive index are alternately stacked, the prism base 131 may effectively cut off hazardous blue light (e.g., 415 nm to 455 nm) harmful to humans.

The prism base 131 illustrated in Ex. 2 (shown in FIG. 9B), substantially the same as that in Ex. 1 (shown in FIG. 9A) is designated by the same reference numeral, and detailed descriptions thereof will be omitted or briefly given. Referring to Ex. 2, each of a plurality of prisms 132 may include alternately stacked first portions 132a and second portions 132b, the first portions 132a having a third refractive index, and the second portions 132b having a fourth refractive index different from the third refractive index.

The material of the first portions 132a may be substantially the same as the material of the first conversion layer 411 described with reference to FIG. 4, and the material of the second portions 132b may be substantially the same as the material of the second conversion layer 412 described with reference to FIG. 4, but the present disclosure is not limited thereto. Also, the first portions 132a and the second portions 132b may include different materials from those described with reference to FIG. 4, respectively.

Referring to Ex. 3 in FIG. 9C, the prismatic sheet 130 of Ex. 3, in addition to the prism base 131 and the prisms 132, may further include a prism outer portion 133. In the prismatic sheet 130 illustrated in Ex. 3, substantially the same components as in Ex. 1 are designated by the same reference numerals, and detailed descriptions thereof will be omitted or briefly given.

The prism outer portion 133 may be located on the light guide plate 120, and may be disposed on at least some areas of the prisms 132.

The prism outer portion 133 may include alternately stacked first portions 133a and second portions 133b, the first portions 133a having a third refractive index, and the second portions 133b having a fourth refractive index different from the third refractive index.

The material of the first portions 133a may be substantially the same as the material of the first conversion layer 411 described with reference to FIG. 4, and the material of the second portions 133b may be substantially the same as the material of the second conversion layer 412 described with reference to FIG. 4, but the present disclosure is not limited thereto. The first portions 133a and the second portions 133b may include different materials from those described with reference to FIG. 4, respectively.

When the prismatic sheet 130 is according to either Ex. 2 or Ex. 3, the effect of the prismatic sheet 130 may be substantially the same as the effect of the prismatic sheet 130 of Ex. 1.

The prismatic sheet 130 illustrated in FIGS. 9A-9C can be used in the exemplary embodiments of FIGS. 1 and 2. When the prism base 131 is disposed as in Ex. 1, Ex. 2, or Ex. 3, and the conversion sheet 400 is disposed between the backlight unit 100 and the display panel 200, hazardous blue light harmful to humans may be cut off more effectively.

The prismatic sheet 130 shown in FIGS. 9A-9C may have a single layer, but is not limited thereto, and may be provided with a plurality of layers.

In other words, the prismatic sheet 130 may be, but is not necessarily limited to, a plurality of layers, which may be disposed between the light guide plate 120 and the diffusion sheet 140.

When the prismatic sheets 130 includes a plurality of layers, one of Ex. 1, Ex. 2, and Ex. 3 may be located on each of the layers, but is not limited thereto.

In one example, when the prismatic sheet 130 has two layers, Ex. 1 and Ex. 2 may be located on the two layers, respectively, but is not limited thereto.

In another example, when the prismatic sheet 130 has two layers, Ex. 1 may be located on both the two layers, but is not limited thereto. Alternatively, when the prismatic sheet 130 has two layers, Ex. 2 may be located on both the two layers, but is not limited thereto. Also, when the prismatic sheet 130 has two layers, Ex. 3 may be located on both the two layers, but is not limited thereto.

Depending on the thickness of each of the layers of the prismatic sheet 130 and the total number of the layers, the characteristics of cutting off blue light harmful to humans may be adjusted.

I. Measurement of Stokes Shift, Hazard Blue Ratio, and Luminance Efficiency

Table 1 below illustrates wavelengths $\lambda_{max}$ (nm) at which the intensity of blue light is maximized or at least increased, Hazard blue ratios (%), CIE xyY, and luminance efficiencies (%) measured from display devices according to Comparative Example 1, Comparative Example 2, and Example.

Comparative Example 1 is a display device that does not use a conversion sheet or a blue light filter layer.

Comparative example 2 is a display device with a blue light filter layer 300 disposed between a backlight unit 100 and a display panel 200, as shown in FIG. 1.

Example is a display device with a conversion sheet 400 disposed between a backlight unit 100 and a display panel 200, as shown in FIG. 2.

The hazardous blue ratios (%) and the luminance efficiencies (%) were analyzed by the following method.

1. Hazardous blue ratio (%) =

{definite integral value over light intensity as a continuous function in a closed interval (415 nm, 455 nm)/definite integral value over light intensity of as a continuous function in a closed interval (400 nm, 500 nm)} × 100 (%)

2. Brightness efficiency (%) =

(brightness/brightness of Comparative Example 1) × 100 (%)

TABLE 1

| | $\lambda_{max}$ (nm) | Hazard Blue Ratio (%) | CIE xyY Color Space | | | Luminance Efficiency (%) |
|---|---|---|---|---|---|---|
| | | | x | y | Y | |
| Comp. Ex. 1 | 457 nm | 36.8 | 0.309 | 0.315 | 490.5 | 100 |
| Comp. Ex. 2 | 457 nm | 19.5 | 0.343 | 0.413 | 482.1 | 78 |
| Example | 462 nm | 11.5 | 0.313 | 0.330 | 494.4 | 94 |

Referring to Table 1, it can be seen that when the blue light filter layer was used as in Comparative Example 2, the wavelength at which blue light has the maximum intensity was the same as in Example 1, and no Stokes shift has occurred.

In contrast, Example illustrates that a Stokes shift has occurred, and that the wavelength $\lambda_{max}$ at which blue light has the maximum intensity has been shifted by 5 μm.

Figure 10:
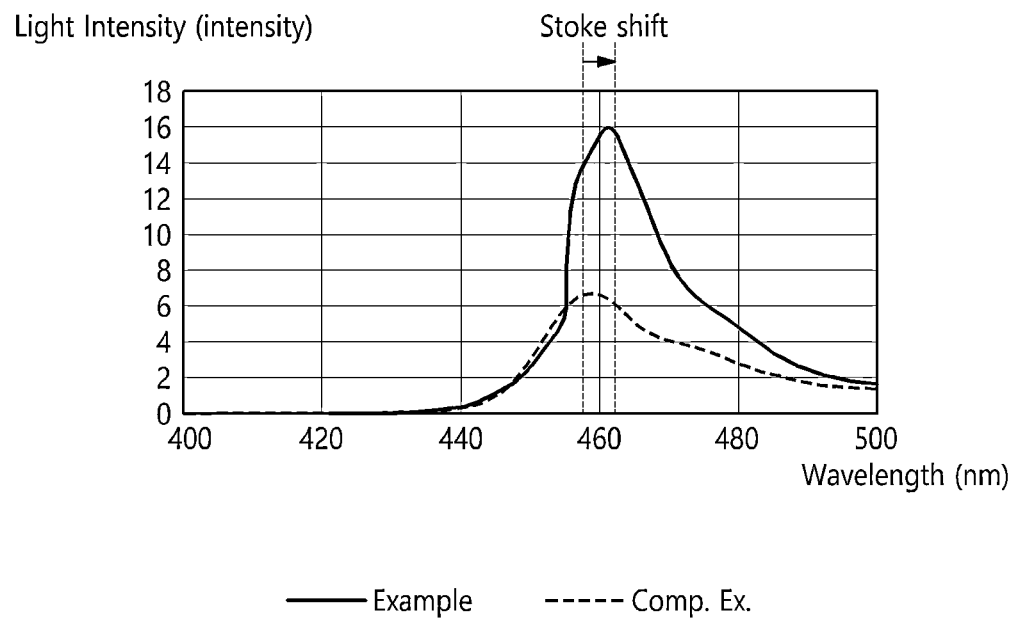
FIG. 10 is a graph illustrating wavelengths (nm) and light intensities according to Example and Comparative Examples.

Referring to FIG. 10, it can be seen that the Stokes shift has occurred in Example compared to Comparative Examples (i.e., Comparative Example 1 and Comparative Example 2).

In addition, comparing Comparative Example 1, Comparative Example 2, and Example, it can be seen that the Hazard blue ratio, which is the percentage of blue light harmful to humans, has been reduced from 36.8% to 19.5% or 11.5%.

This indicates that the blue light filter layer of Comparative Example 2 (as shown in FIG. 1) and the conversion sheet of Example (as shown in FIG. 2) are effective in reducing blue light harmful to humans.

In addition, because Example has a lower Hazard blue ratio than Comparative Example 2 (as shown in FIG. 1), it can be seen that the conversion sheet of Example (as shown in FIG. 2) has a greater effect on reducing blue light harmful to humans than the blue light filter layer of Comparative Example 2 (as shown in FIG. 1).

In addition, when comparing Comparative Example 1, Comparative Example 2, and Example in the CIE xyY color space, it can be seen that Comparative Example 2 has a color change due to different y and Y values, unlike Comparative Example 1.

In contrast, when comparing Comparative Example 1 and Example, it can be seen that the values of x, y, and Y in CIE xyY are substantially the same, and there has been almost no color change.

The result of almost no color change shows that the color reproduction efficiency has been improved.

For luminance efficiency, Comparative Example 2 shows a significant decrease in luminance.

In contrast, Example shows a small decrease in luminance compared to Comparative Example 2.

Therefore, the exemplary embodiments of the present disclosure provide a display device able to shift a blue light wavelength harmful to humans to a blue light wavelength not harmful to humans while maintaining the brightness of the blue light.

II. Cutoff Measurement

Table 2 below illustrates the results of measuring T90-T10 for display devices according to Comparative Example 2 and Example to compare the cutoff characteristics of blue light harmful to humans.

$T90 - T10 =$ Wavelength at 90% Transmissivity −

Wavelength at 10% Transmissivity (nm)

TABLE 2

| | $\lambda$ ($T_{90} - T_{10}$) (nm) |
|---|---|
| Comparative Example 2 | 32 |
| Example | 5 |

When comparing Comparative Example 2 and Example as shown in Table 2 above, it can be seen that Comparative Example 2 has a larger T90-T10 value of 32 nm, while Example has a smaller value of 5 nm.

Figure 11:
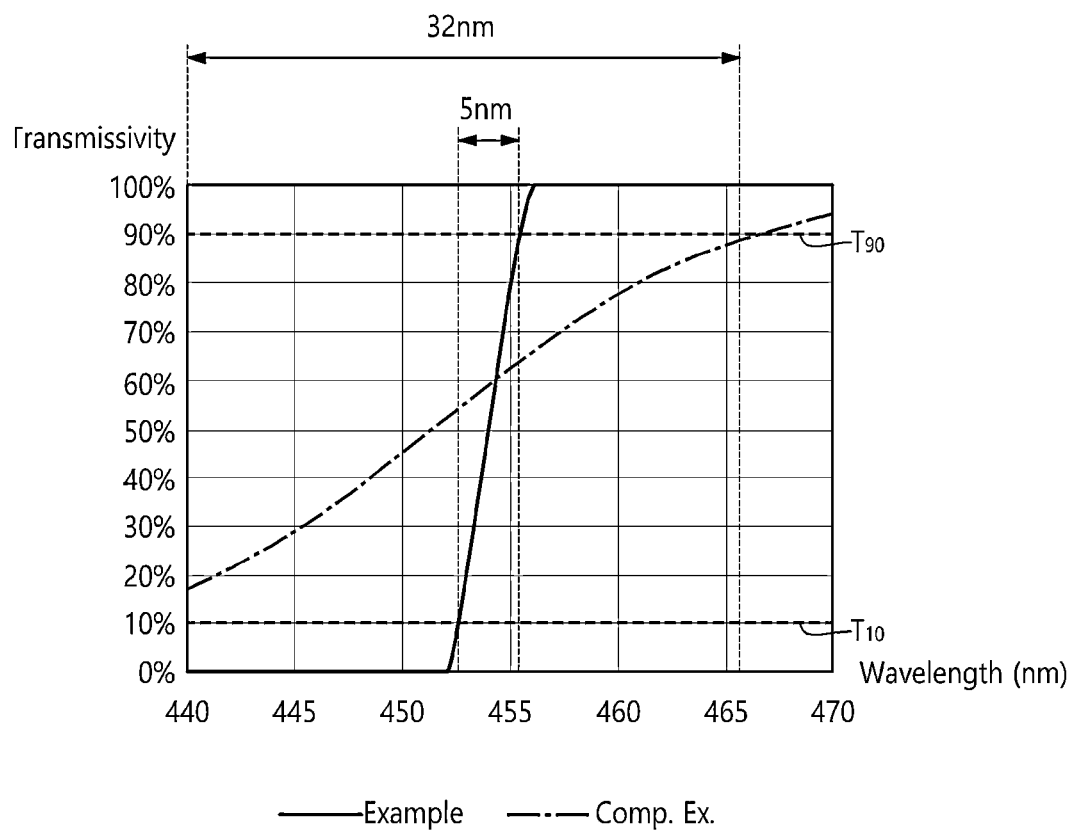
FIG. 11 is a graph illustrating wavelengths (nm) and transmissivities according to Example and Comparative Examples.

Referring to FIG. 11, it can be seen that Comparative Example (i.e., Comparative Example 2 in Table 2) has a gentle decrease in transmissivity from 90% to 10% while Example has a steep decrease in transmissivity from 90% to 10%.

These results show that Example has a steep decrease in transmissivity near 455 nm, which is the upper limit of blue light harmful to humans, and thus can effectively cut off blue light (e.g., 415 nm to 455 nm) harmful to humans.

In contrast, it can be seen that Comparative Examples failed to effectively cut off blue light, which is harmful to humans.

Therefore, in a display device according to the exemplary embodiments of the present disclosure, hazardous blue light harmful to humans may be cut off more effectively.

The embodiments described hereinabove will be briefly described as follows.

A display device according to exemplary embodiments includes: a display panel; a backlight unit supplying light to the display panel; and a conversion sheet located between the backlight unit and the display panel, wherein the conversion sheet includes at least one conversion pattern configured such that a top portion thereof has a greater area than a bottom portion thereof, and the at least one conversion pattern includes alternately stacked at least one first conversion layer having a first refractive index and at least one second conversion layer having a second refractive index different from the first refractive index.

The at least one first conversion layer may be located at an end of the at least one conversion pattern, and the first refractive index may be greater than the second refractive index.

The first refractive index may be greater than or equal to 1.6, and the second refractive index may be less than or equal to 1.4.

At least one of the first conversion layer or the second conversion layer may include two or more conversion layers.

Each of the thickness of the thickest first conversion layer of the two or more first conversion layers and the thickness of the thickest second conversion layer of the two or more second conversion layers may be 5 μm or less.

The backlight unit may include: a plurality of light sources; a light guide plate into which light emitted from the light sources enters; and a prism sheet including a prism base located on the light guide plate and a plurality of prisms located on the prism base, wherein the prism base includes alternately stacked first portion having a third refractive index and second portion having a fourth refractive index.

The prism sheet may include the plurality of prisms in the shape of a triangular column.

The backlight unit may further comprise a diffusion sheet disposed on the prism sheet.

The conversion sheet may further include blue light quantum dots and hollow scatterers.

The conversion sheet may further comprise a base layer, and the blue light quantum dots and the hollow scatterers are dispersed in the base layer.

The number of the hollow scatterers may be greater than the number of the blue light quantum dots.

Each of the blue light quantum dots may include a core, a shell and a ligand bound to the surface of the shell.

The top portion of the at least one conversion pattern may have the shape of stripes.

The top portion of the at least one conversion pattern may have the shape of islands.

The at least one conversion pattern may be disposed to be spaced apart from each other.

A display device according to exemplary embodiments includes: a display panel; a backlight unit supplying light to the display panel; and a conversion sheet located between the backlight unit and the display panel, wherein the conversion sheet includes blue light quantum dots, hollow scatterers, a base layer, and at least one conversion pattern having a second refractive index different from a first refractive index of the base layer, wherein the at least one conversion pattern is configured such that a top portion thereof has a greater area than a bottom portion thereof.

The first refractive index of the base layer may be greater than the second refractive index of the at least one conversion pattern.

The first refractive index of the base layer may be greater than or equal to 1.8, and the second refractive index of the at least one conversion pattern is less than 1.8.

The backlight unit may include: a plurality of light sources; a light guide plate into which light emitted from the light sources enters; and a prism sheet including a prism base located on the light guide plate and a plurality of prisms located on the prism base, wherein the prism base includes alternately stacked first portion having a third refractive index and second portion having a fourth refractive index.

Each of the plurality of prisms may comprise alternately stacked first portions having a fourth refractive index and second portions having a fifth refractive index different from the fourth refractive index.

The number of the hollow scatterers may be greater than the number of the blue light quantum dots.

The top portion of the at least one conversion pattern may have the shape of stripes.

The top portion of the at least one conversion pattern may have the shape of islands.

A backlight unit according to exemplary embodiments includes: a plurality of light sources; a light guide plate into which light emitted from the light sources enters; and a prism sheet including a prism base located on the light guide plate and a plurality of prisms located on the prism base, wherein the prism base includes alternately stacked first portion having a third refractive index and second portion having a fourth refractive index.

Each of the prisms may include alternately stacked first portions having a third refractive index and second portions having a fourth refractive index different from the third refractive index.

The backlight unit may further include a prism outer portion located on the light guide plate and disposed on at least some areas of the prisms, wherein the prism outer portion includes alternately stacked first portion having a third refractive index and second portion having a fourth refractive index different from the third refractive index.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

What is claimed is:

1. A display device comprising:
a display panel;
a backlight unit supplying light to the display panel; and
a conversion sheet between the backlight unit and the display panel,
wherein the conversion sheet comprises at least one conversion pattern and a top portion of the at least one conversion pattern has a greater area than a bottom portion of the at least one conversion pattern, and
wherein the at least one conversion pattern comprises alternately stacked at least one first conversion layer having a first refractive index and at least one second conversion layer having a second refractive index different from the first refractive index.

2. The display device of claim 1, wherein the at least one first conversion layer is at an end of the at least one conversion pattern, and the first refractive index is greater than the second refractive index.

3. The display device of claim 1, wherein the first refractive index is greater than or equal to 1.6, and the second refractive index is less than or equal to 1.4.

4. The display device of claim 1, wherein at least one of the at least one first conversion layer or the at least one second conversion layer comprises two or more conversion layers.

5. The display device of claim 4, wherein each of a thickness of a thickest first conversion layer of two or more first conversion layers and a thickness of a thickest second conversion layer of two or more second conversion layers is 5 μm or less.

6. The display device of claim 1, wherein the backlight unit comprises:
a plurality of light sources;
a light guide plate into which light emitted from the plurality of light sources enters; and
a prism sheet comprising a prism base on the light guide plate and a plurality of prisms on the prism base,
wherein the prism base comprises alternately stacked first portion having a third refractive index and second portion having a fourth refractive index.

7. The display device of claim 6, wherein the prism sheet includes the plurality of prisms in a shape of a triangular column.

8. The display device of claim 6, wherein the backlight unit further comprises a diffusion sheet on the prism sheet.

9. The display device of claim 1, wherein the conversion sheet further comprises blue light quantum dots and hollow scatterers.

10. The display device of claim 9, wherein the conversion sheet further comprises a base layer, and the blue light quantum dots and the hollow scatterers are dispersed in the base layer.

11. The display device of claim 9, wherein a number of the hollow scatterers is greater than a number of the blue light quantum dots.

12. The display device of claim 9, wherein each of the blue light quantum dots includes a core, a shell and a ligand bound to a surface of the shell.

13. The display device of claim 1, wherein a top portion of the at least one conversion pattern has a shape of stripes.

14. The display device of claim 1, wherein a top portion of the at least one conversion pattern has a shape of islands.

15. The display device of claim 1, wherein the at least one conversion pattern is spaced apart from each other.

16. A display device comprising:
a display panel;
a backlight unit supplying light to the display panel; and
a conversion sheet between the backlight unit and the display panel,
wherein the conversion sheet comprises blue light quantum dots, hollow scatterers, a base layer, and at least one conversion pattern having a second refractive index different from a first refractive index of the base layer,
wherein a top portion of the at least one conversion pattern has a greater area than a bottom portion of the at least one conversion pattern.

17. The display device of claim 16, the first refractive index of the base layer is greater than the second refractive index of the at least one conversion pattern.

18. The display device of claim 16, wherein the first refractive index of the base layer is greater than or equal to 1.8, and the second refractive index of the at least one conversion pattern is less than 1.8.

19. The display device of claim 16, wherein the backlight unit comprises:
a plurality of light sources;
a light guide plate into which light emitted from the plurality of light sources enters; and
a prism sheet comprising a prism base on the light guide plate and a plurality of prisms located on the prism base,
wherein the prism base comprises alternately stacked first portion having a third refractive index and second portion having a fourth refractive index.

20. The display device of claim 19, wherein each of the plurality of prisms comprises alternately stacked first portion having a fourth refractive index and second portion having a fifth refractive index different from the fourth refractive index.

21. The display device of claim 16, wherein a number of the hollow scatterers is greater than a number of the blue light quantum dots.

22. The display device of claim 16, wherein a top portion of the at least one conversion pattern has a shape of stripes.

23. The display device of claim 16, wherein a top portion of the at least one conversion pattern has a shape of islands.

24. A backlight unit comprising:
a plurality of light sources;
a light guide plate into which light emitted from the plurality of light sources enters; and
a prism sheet comprising a prism base on the light guide plate and a plurality of prisms located on the prism base, wherein the prism base comprises alternately stacked first portion having a third refractive index and second portion having a fourth refractive index.

25. The backlight unit of claim 24, wherein each of the plurality of prisms comprises alternately stacked first portion having a third refractive index and second portion having a fourth refractive index different from the third refractive index.

26. The backlight unit of claim 24, further comprising a prism outer portion located on the light guide plate and disposed on at least some areas of the plurality of prisms, wherein the prism outer portion comprises alternately stacked first portion having a third refractive index and second portion having a fourth refractive index different from the third refractive index.

* * * * *